United States Patent
Westerbeke, Jr. et al.

(10) Patent No.: US 6,799,422 B2
(45) Date of Patent: Oct. 5, 2004

(54) EMISSIONS CONTROL

(75) Inventors: John H. Westerbeke, Jr., Milton, MA (US); Erik S. Larson, Norwood, MA (US)

(73) Assignee: Westerbeke Corporation, Taunton, MA (US)

( * ) Notice: Subject to any disclaimer, the term of this patent is extended or adjusted under 35 U.S.C. 154(b) by 0 days.

(21) Appl. No.: 10/225,629

(22) Filed: Aug. 22, 2002

(65) Prior Publication Data

US 2004/0035100 A1 Feb. 26, 2004

(51) Int. Cl.$^7$ ................................................. F01N 3/00
(52) U.S. Cl. ........................... 60/289; 60/274; 60/290; 60/298; 60/310
(58) Field of Search ..................... 60/274, 289, 290, 60/298, 291, 310

(56) References Cited

U.S. PATENT DOCUMENTS

| | | | |
|---|---|---|---|
| 3,791,146 A | * | 2/1974 | Hayashi ........................ 60/289 |
| 5,125,231 A | | 6/1992 | Patil et al. |
| 5,536,477 A | | 7/1996 | Cha et al. |
| 5,809,773 A | * | 9/1998 | Gottberg ........................ 60/274 |
| 5,813,222 A | | 9/1998 | Appleby |
| 5,921,076 A | | 7/1999 | Krutzsch et al. |
| 5,937,637 A | | 8/1999 | Fujishita et al. |
| 6,044,643 A | * | 4/2000 | Ittner et al. .................... 60/289 |
| 6,047,542 A | | 4/2000 | Kinugasa et al. |
| 6,122,909 A | | 9/2000 | Murphy et al. |
| 6,122,910 A | * | 9/2000 | Hoshi et al. ................... 60/297 |
| 6,432,368 B1 | * | 8/2002 | Feitelberg et al. ............ 422/190 |
| 6,446,431 B1 | * | 9/2002 | Bruck ............................ 60/289 |
| 6,511,355 B1 | * | 1/2003 | Woodward ................. 440/89 H |

FOREIGN PATENT DOCUMENTS

WO  WO 97/47863   12/1997

* cited by examiner

Primary Examiner—Thomas Denion
Assistant Examiner—Diem Tran
(74) Attorney, Agent, or Firm—Fish & Richardson P.C.

(57) ABSTRACT

A method of controlling emissions from a fixed-speed internal combustion engine includes injecting a controlled flow of air into the exhaust between a first catalyst bed adapted to reduce HC and NOx emissions, and a second catalyst bed adapted to reduce CO emissions. The flow of air is controlled to optimize the level of CO emissions, preferably as a function of engine load or temperature. In a marine engine-generator set, the flow of air is controlled as a function of generator load or temperature of the exhaust mixture entering the second catalyst bed, and seawater is injected into the exhaust stream downstream of the catalysts.

58 Claims, 4 Drawing Sheets

EMISSIONS CONTROL

TECHNICAL FIELD

This invention relates to controlling emissions from internal combustion engines, such as from fixed-speed engines driving electrical generators and the like.

BACKGROUND

Reducing combustion engine exhaust emissions is a continual object of research and development, driven both by awareness of environmental effects and increased government regulation. Some of the most effective and cost-efficient emissions controls involve the use of downstream chemical catalysts that further oxygenate incompletely combusted compounds. Sometimes exhaust is directed sequentially through multiple catalyst beds. It is generally understood that higher catalyst temperatures provide more effective emissions control. Much exhaust catalysis development has been focused on developing catalytic converters for automotive applications, in which engine speed varies substantially with vehicle speed and gear selection.

In several other applications, such as in powering fixed-frequency electrical generators, engine speed is held as constant as possible during use, even while generator and engine loads fluctuate. Some engine-generator sets are designed for installation on board moving vehicles, either on land or in water.

Marine generators are subjected to specific regulations, both for emissions and for safety concerns. For example, exposed engine surface temperatures (including exhaust system surface temperatures) must be kept low to avoid increased risk of fire hazard. Seawater is injected into many marine engine exhaust flows so as to cool exiting exhaust gases, and seawater is also frequently circulated through exhaust system components so as to maintain low surface temperatures.

Further improvements in exhaust emissions controls for constant speed engine applications are desired, particularly improvements suitable for marine use.

SUMMARY

Many aspects of the invention feature methods of controlling emissions from a fixed-speed internal combustion engine.

In one aspect, the method includes governing engine speed with respect to a selected constant speed; flowing exhaust from the engine through an exhaust system, the exhaust flowing through, in order, a first catalyst, an inter-catalyst space, and a second catalyst; injecting oxygen-laden gas (such as atmospheric air) into the exhaust in the inter-catalyst space, such that the exhaust and the oxygen-laden gas both flow through the second catalyst; and controlling a rate of oxygen-laden gas injection as a function of a variable that changes with engine load.

In some cases, controlling the gas injection rate includes electronically monitoring the variable that varies with engine load. For example, the rate of gas injection may be selected from a specific series of discrete rates as a function of the monitored variable. In some applications the gas injection rate is controlled by an electronic controller with memory configured to store a predetermined table of variable values and associated gas injection rates.

In some preferred embodiments, the engine is driving an electrical generator. In some such embodiments, the monitored variable is generator output current.

In some other embodiments, the monitored variable is engine driveshaft torque or exhaust manifold pressure.

Preferably, the injection rate is increased when engine load increases, and decreased when engine load decreases.

Controlling the gas injection rate includes, in some embodiments, varying operating speed of an air pump motivating the oxygen-laden gas into the inter-catalyst space. In some other embodiments, it includes modulating a valve operably disposed between a source of pressurized oxygen-laden gas and the inter-catalyst space. The valve may be a dump valve, for example, modulated to dump a variable proportion of an incoming flow of gas to atmosphere.

In some instances, water (such as seawater) is injected into the exhaust downstream of the second catalyst. This may be water employed to cool the exhaust housing about the catalysts. For example, the first and second catalysts may both be disposed within a water-jacketed housing, with cooling water flowing through the housing is injected into the exhaust downstream of the second catalyst. In some cases, the first catalyst is disposed within a water-jacketed exhaust manifold and the second catalyst is disposed within a water-jacketed exhaust elbow secured to an outlet of the manifold, with cooling water flowing from the manifold into the elbow before mixing with the exhaust. This arrangement is particularly useful to marine applications with tight exhaust surface temperature requirements and available seawater.

According to another aspect, the method includes governing engine speed to maintain a desired generator output frequency over a range of operating loads; flowing exhaust from the engine through an exhaust system, the exhaust flowing through, in order, a first catalyst, an inter-catalyst space, and a second catalyst; determining approximate engine load; injecting air into the exhaust in the inter-catalyst space at a rate selected according to the determined approximate engine load; and injecting seawater into the exhaust downstream of the second catalyst.

In many preferred embodiments, approximate engine load is determined by monitoring generator output, and wherein in the rate of air injection is selected according to the monitored generator output. The monitored generator output can be, for example, generator current.

In some cases, approximate engine load is determined by monitoring engine exhaust manifold pressure, the rate of air injection being selected according to the monitored manifold pressure.

The first and second catalysts are both preferably disposed within a water-jacketed housing, that may be hydraulically connected to a source of seawater. In some cases cooling water flowing through the housing is injected into the exhaust downstream of the second catalyst.

According to another aspect, the method includes governing engine speed with respect to a selected constant speed; flowing exhaust from the engine through an exhaust system, the exhaust flowing through, in order, a first catalyst, an inter-catalyst space, and a second catalyst; injecting oxygen-laden gas (such as atmospheric air) into the exhaust in the inter-catalyst space, such that the exhaust and the oxygen-laden gas both flow through the second catalyst; and controlling a rate of oxygen-laden gas injection as a function of temperature within the inter-catalyst space.

In a preferred configuration, controlling the gas injection rate includes electronically monitoring inter-catalyst space temperature, and may also include selecting the rate of gas injection from a specific series of discrete rates as a function of inter-catalyst space temperature.

In some cases, the engine is driving an electrical generator.

The gas injection rate is preferably increased when inter-catalyst space temperature increases.

Controlling the gas injection rate may include varying operating speed of an air pump motivating the oxygen-laden gas into the inter-catalyst space, or modulating a valve operably disposed between a source of pressurized oxygen-laden gas and the inter-catalyst space, for example.

In some applications, water (such as seawater) is injected into the exhaust downstream of the second catalyst.

As discussed above, the first and second catalysts are both preferably disposed within a water-jacketed housing for some applications. Cooling water flowing through the housing may be injected into the exhaust downstream of the second catalyst. In one configuration, the first catalyst is disposed within a water-jacketed exhaust manifold, and the second catalyst is disposed within a water-jacketed exhaust elbow secured to an outlet of the manifold, with cooling water flowing from the manifold into the elbow before mixing with the exhaust.

According to yet another aspect, the method includes governing engine speed with respect to a selected constant speed; flowing exhaust from the engine through an exhaust system, the exhaust flowing through, in order, a first catalyst, an inter-catalyst space, and a second catalyst; injecting oxygen-laden gas into the exhaust in the inter-catalyst space, such that the exhaust and the oxygen-laden gas both flow through the second catalyst; sensing carbon monoxide at a point downstream of the second catalyst; and controlling a rate of injection of the oxygen-laden gas as a function of sensed carbon monoxide.

In some embodiments, controlling the rate of injection of the oxygen-laden gas includes varying the rate of injection as a function of a variation of sensed carbon monoxide between different injection rates.

In some configurations, a portion of the exhaust is diverted into an auxiliary flow path downstream of the catalysts, and carbon monoxide is sensed by a sensor disposed along the auxiliary flow path. The diverted portion of exhaust may be passed through a cooler and/or a filter disposed along the auxiliary flow path upstream of the sensor.

According to another aspect of the invention, an engine-generator set includes a fixed-speed internal combustion engine and an electrical generator coupled to an output shaft of the engine. The engine includes an exhaust system containing first and second catalyst beds and defining an inter-catalyst space between the beds, and an air pump connected to the exhaust system to introduce a flow of air into the inter-catalyst space as a function of a variable that changes with engine load.

In many applications, the flow of air is controlled by an electronic controller. The controller is preferably configured to select a rate of gas injection from a specific series of discrete rates as a function of the monitored variable, and may include memory configured to store a predetermined table of variable values and associated gas injection rates.

In some embodiments, the variable is generator output current and the engine-generator set includes a sensor responsive to generator output current. In some other cases, the variable is engine driveshaft torque and the engine-generator set includes a sensor responsive to driveshaft torque.

In yet some other configurations, the variable is exhaust pressure. For example, exhaust manifold pressure may be sensed by a sensor responsive to exhaust manifold pressure, or exhaust backpressure may be sensed by a sensor responsive to exhaust pressure downstream of the catalyst beds.

The air pump may be electrically driven, with speed of the pump controlled as a function of the variable that changes with engine load, or the air pump is driven by the engine, with the flow of air introduced into the inter-catalyst space through a valve that is controlled as a function of the variable that changes with engine load, as examples.

The first and second catalysts may be both disposed within a water-jacketed housing, such as with cooling water flowing through the housing and injected into the exhaust downstream of the second catalyst. For example, the first catalyst may be disposed within a water-jacketed exhaust manifold, and the second catalyst is disposed within a water-jacketed exhaust elbow secured to an outlet of the manifold, with cooling water flowing from the manifold into the elbow before mixing with the exhaust. For marine applications, the water-jacketed housing may be hydraulically connected to a source of seawater. Preferably, the entire inter-catalyst space is disposed within the water-jacketed housing.

For marine power generation, the engine-generator set may be mounted to the hull of a boat for providing on-board electrical power.

According to another aspect, an engine-generator set includes a fixed-speed internal combustion engine and an electrical generator coupled to an output shaft of the engine. The engine includes an exhaust system containing first and second catalyst beds and definse an inter-catalyst space between the beds. An air pump is connected to the exhaust system to introduce a flow of air into the inter-catalyst space as a function of temperature within the inter-catalyst space.

In some embodiments, a temperature sensor (such as a thermistor or thermocouple) is disposed within the inter-catalyst space and spaced from both first and second catalysts. An air flow controller is adapted to receive a signal from the temperature sensor and to vary flow of air into the inter-catalyst space as a function of the received signal.

According to another aspect of the invention, a method of sensing a target component of an exhaust stream includes diverting a proportion of the exhaust stream, cooling and/or filtering the diverted proportion, sensing the target component in the cooled and/or filtered diverted proportion, and then reintroducing the diverted proportion to the exhaust stream at a point downstream of where it was diverted.

In some embodiments, the diverted proportion is reintroduced in a venturi through which an undiverted portion of the exhaust stream flows.

In some cases, the method includes controlling a valve positioned within the exhaust stream between where the diverted proportion is diverted and where it is reintroduced.

In some embodiments, the diverted proportion is cooled by passing through a channel defined within a water-jacketed manifold receiving exhaust from multiple cylinders of an internal combustion engine.

Various aspects of the invention can improve engine emissions by further reducing levels of a selected emissions component, such as carbon monoxide, after the exhaust has flowed through a first catalyst bed optimized for overall emissions reductions. Control of an injected air stream into the exhaust ahead of a second catalyst can be accomplished with feedback from readily monitorable parameters related to engine load, such as generator current or exhaust system pressure, or by temperature of the catalyst or exhaust. Such control can be particularly useful in maintaining efficient catalysis temperatures in systems such as marine engines, where external exhaust temperatures must be kept particularly low, such as by liquid-cooling exhaust components. Some aspects of the invention can be useful for improving the reliability of sensors sensing target components of an exhaust stream, such as CO.

Some of the aspects of the invention may also have utility in controlling emissions from combustion engines in applications in which the engine speed varies significantly.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
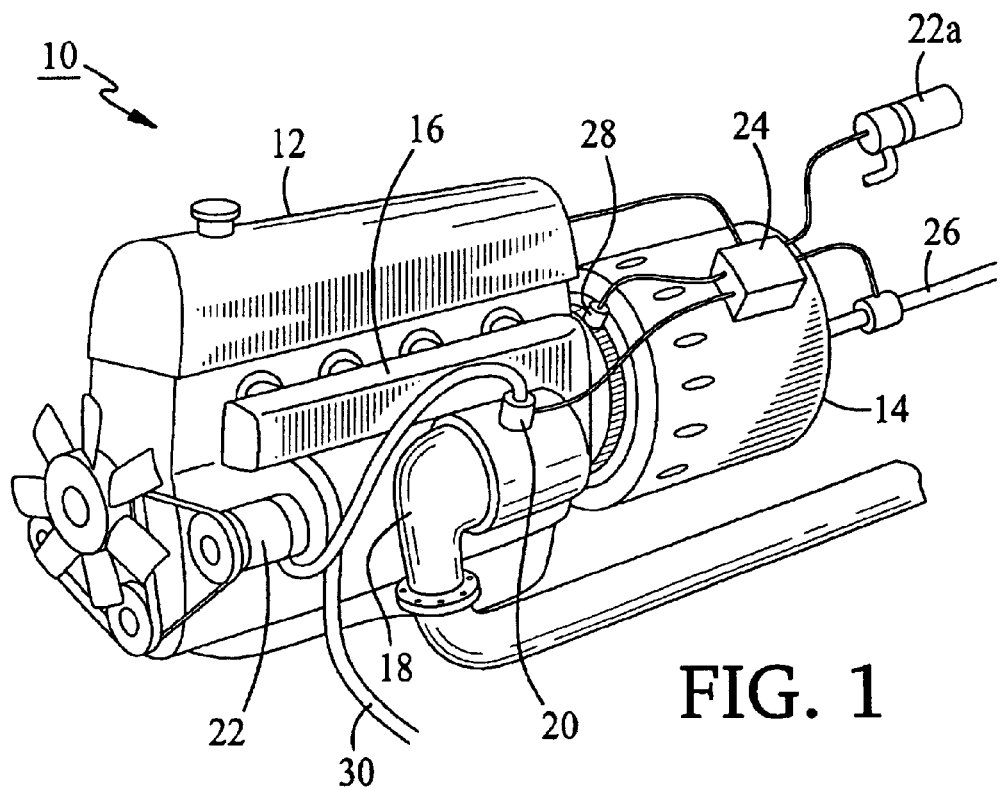
FIG. 1 is a perspective view of a marine engine-generator set.

Referring first to FIG. 1, engine-generator set 10 includes an internal combustion engine 12 driving an electrical generator 14. Engine 10 has an exhaust manifold 16 that receives and combines exhaust gasses from each cylinder of the engine and directs the combined exhaust gasses through each of two separate catalyst materials contained within the manifold, as is discussed in more detail below. Secured to the outlet of the manifold is an exhaust elbow 18.

Air is delivered to manifold 16, through a controllable dump valve 20, from belt-driven air pump 22. A fixed speed, electric air pump may also be employed. Valve 20 is controlled by an electronic controller 24 to moderate the flow of air into manifold 16 as a function of the load placed on engine 12. Controller 24 varies a signal to valve 20 as a function of engine load, or as a function of a sensible parameter that changes with engine load. In the illustrated embodiment, controller 24 senses an output voltage and/or current of generator 14, such as at generator output 26, and controls valve 20 accordingly. Controller 24 also senses engine speed, such as by receiving a signal from flywheel magnetic reluctance sensor 28, and controls engine inputs (such as fuel and/or air flow) to maintain engine speed at or near a desired set point, so as to maintain the frequency of generator 14.

As an alternative to controlling a dump valve 20 splitting pump air flow between atmosphere and manifold 16, a variable speed electric air pump 22a is employed in some instances, with controller 24 varying the operating speed of pump 22a as a function of engine load. In such cases, the entire output of pump 22a is preferably ported directly to manifold 16.

Water, such as cold seawater, is supplied to manifold 16 through hose 30. The water is directed through cooling passages in manifold 16 and elbow 18 to keep the outer surfaces of the exhaust system at or below a desired temperature, and is then injected into the exhaust stream in elbow 18, downstream of the catalysts, to cool the exhaust.

Figure 2:
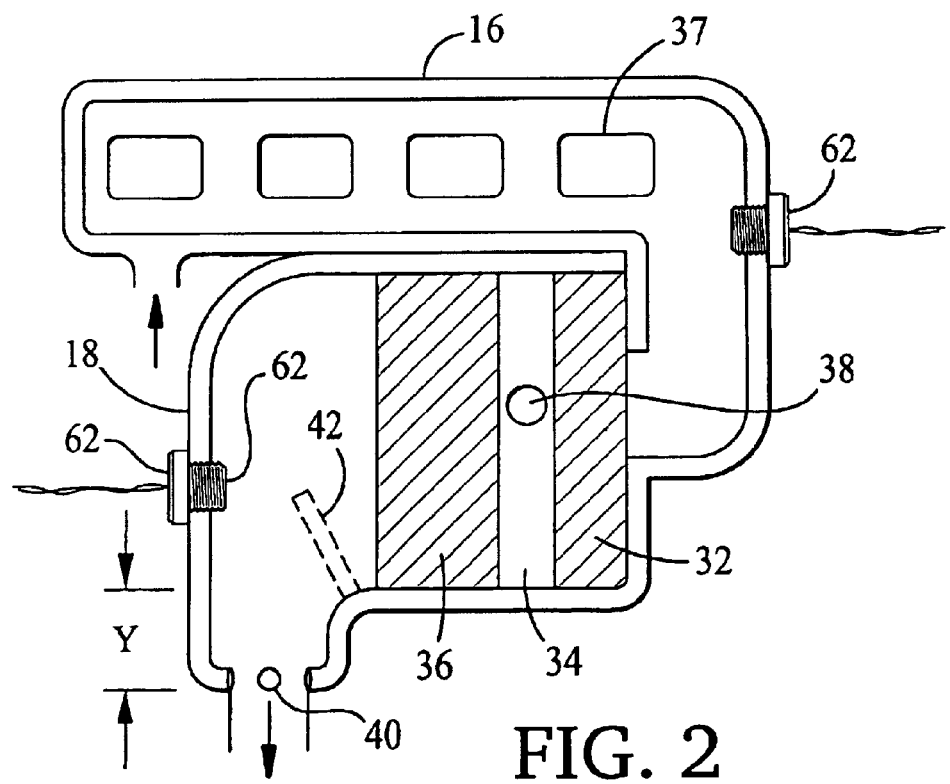
FIG. 2 is a schematic cross-section illustrating flow through the exhaust manifold and elbow of the engine-generator set of FIG. 1.

As illustrated in FIG. 2, within manifold 16 exhaust is combined and directed through a first catalyst bed 32, then across a space 34, and then through a second catalyst bed 36. The first catalyst is positioned at a flow length of about six to eight inches downstream of the closest exhaust inlet 37 to the manifold. The air is injected into the manifold in space 34, through air inlet 38. As illustrated, cooling water flows around both catalyst beds, through appropriate channels cast into manifold 16 and elbow 18, and is then injected into the exhaust flow. In marine applications where the cooling seawater can have a high salt content, the water injection outlets 40 in elbow 40 are preferably at least a distance "Y" of about six inches (15 centimeters) below the lowest edge of the catalysts or the upper edge of any internal elbow baffles 42 positioned to avoid salt water splash on the hot catalysts. Also, it is preferred that for such marine applications manifold 16 and elbow 18 be cast of a corrosion-resistant material, such as an aluminum-magnesium alloy. It will be apparent from FIG. 2 that the connection between manifold 16 and elbow 18 can be readily positioned between the two catalyst beds, such that second catalyst 36 is carried within elbow 18.

The first catalyst bed 32 preferably contains a catalyst, such as one containing rhodium as the precious metal, selected to reduce hydrocarbon and NOx emissions. For example, one preferred catalyst bed is in the form of a cylinder 3.0 inches (76 millimeters) in diameter and 2.6 inches (6.7 centimeters) long. The ceramic substrate has a cross-sectional area of about 7 square inches (45 square centimeters) and has about 400 cells per square inch (62 per square centimeter), and is washed with 6.1 grams per cubic foot (0.06 grams per cubic centimeter) of rhodium. Such a catalyst bed is available from ASEC/Delphi Exhaust and Engine Management of Flint, Mich.

Catalysis efficiency within first catalysis bed 32 may be accomplished by various methods known in the art, either in carbureted or fuel-injected systems with oxygen sensors, to remove as much of the overall emissions components as possible.

The second catalyst bed 36 contains a catalyst selected to further reduce CO emissions. In one arrangement, second catalyst bed 36 contains a three to one ratio of palladium and platinum, carried on a honey-combed substrate of ceramic or metal. The active precious metals are washed onto the substrate and then heated to set the metals onto the surface as known in the art. An example of a preferred second catalyst bed is a metal substrate in the form of a cylinder of 5.0 inch (12.7 centimeter) diameter and 6.3 inch (16 centimeter) length, with 19.6 square inches (126 square centimeters) of cross-sectional area, washed with 40 grams per cubic foot (0.4 grams per cubic centimeter) each of palladium and platinum. Such a catalyst is available from Miratech of Tulsa, Okla., for example. Second catalyst 36 will tend to run hotter, such as perhaps about 400 degrees Fahrenheit (220 degrees Celsius) hotter than the rhodium catalyst. Preferably, the temperature of the combined air and exhaust entering the second catalyst is about 1000 degrees Fahrenheit (540 degrees Celsius).

Figure 3:
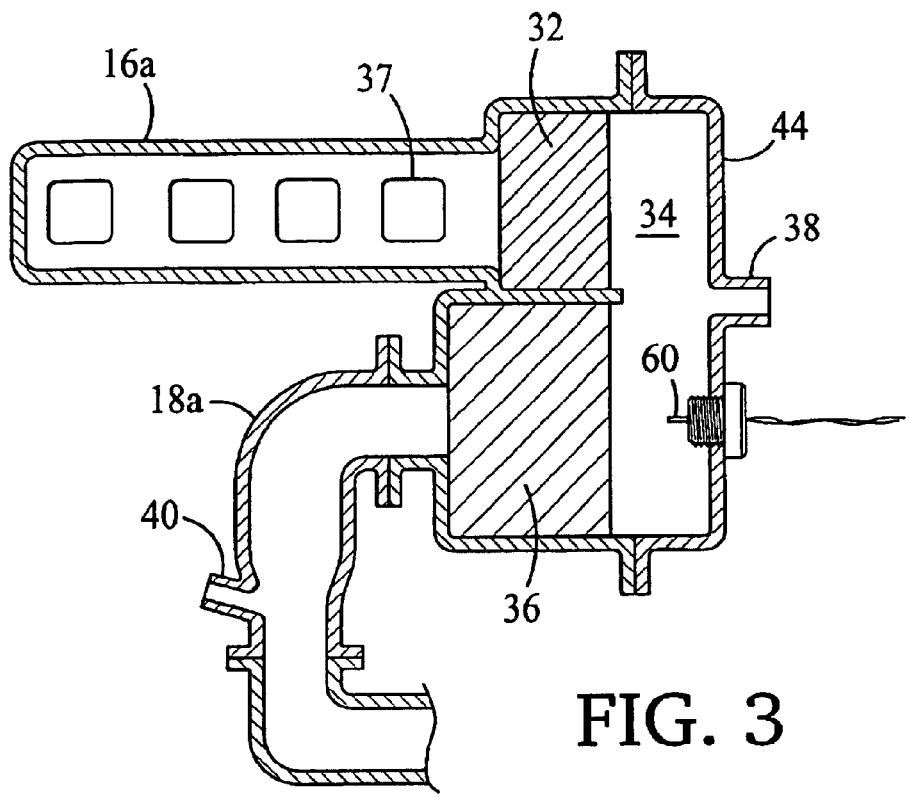
FIG. 3 illustrates a second exhaust manifold construction and catalyst arrangement.

The dual catalyst beds may be suitably arranged in other configurations. For example, FIG. 3 shows the first catalyst 32 contained within a first bore of manifold 16a, in-line with exhaust inlets 37, and second catalyst 36 contained within a second bore of the manifold, parallel to and offset from the first bore. The manifold is equipped with a removable cover 44 through which the air is injected, enabling loading of both of the catalysts into their respective bores. As in the first illustrated embodiment, after flowing through both catalyst beds the exhaust flow is combined with cooling water in elbow 18a.

Figure 4:
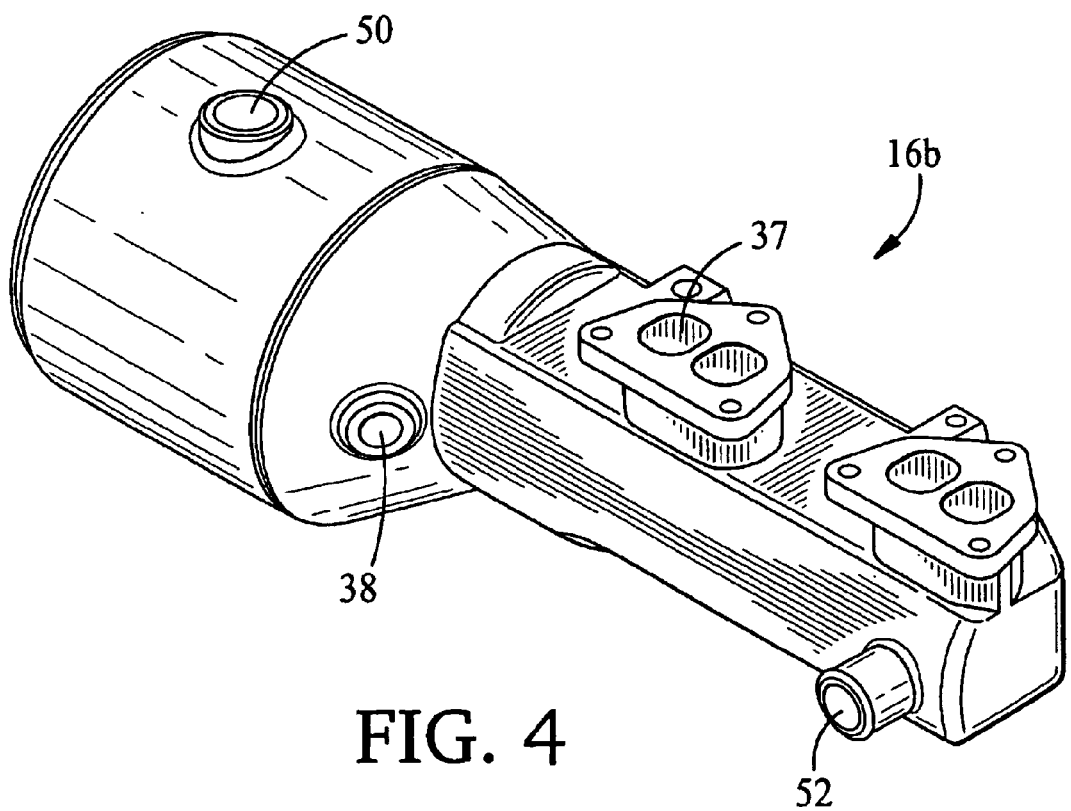
FIG. 4 is a perspective view of an engine exhaust manifold.
Figure 5:
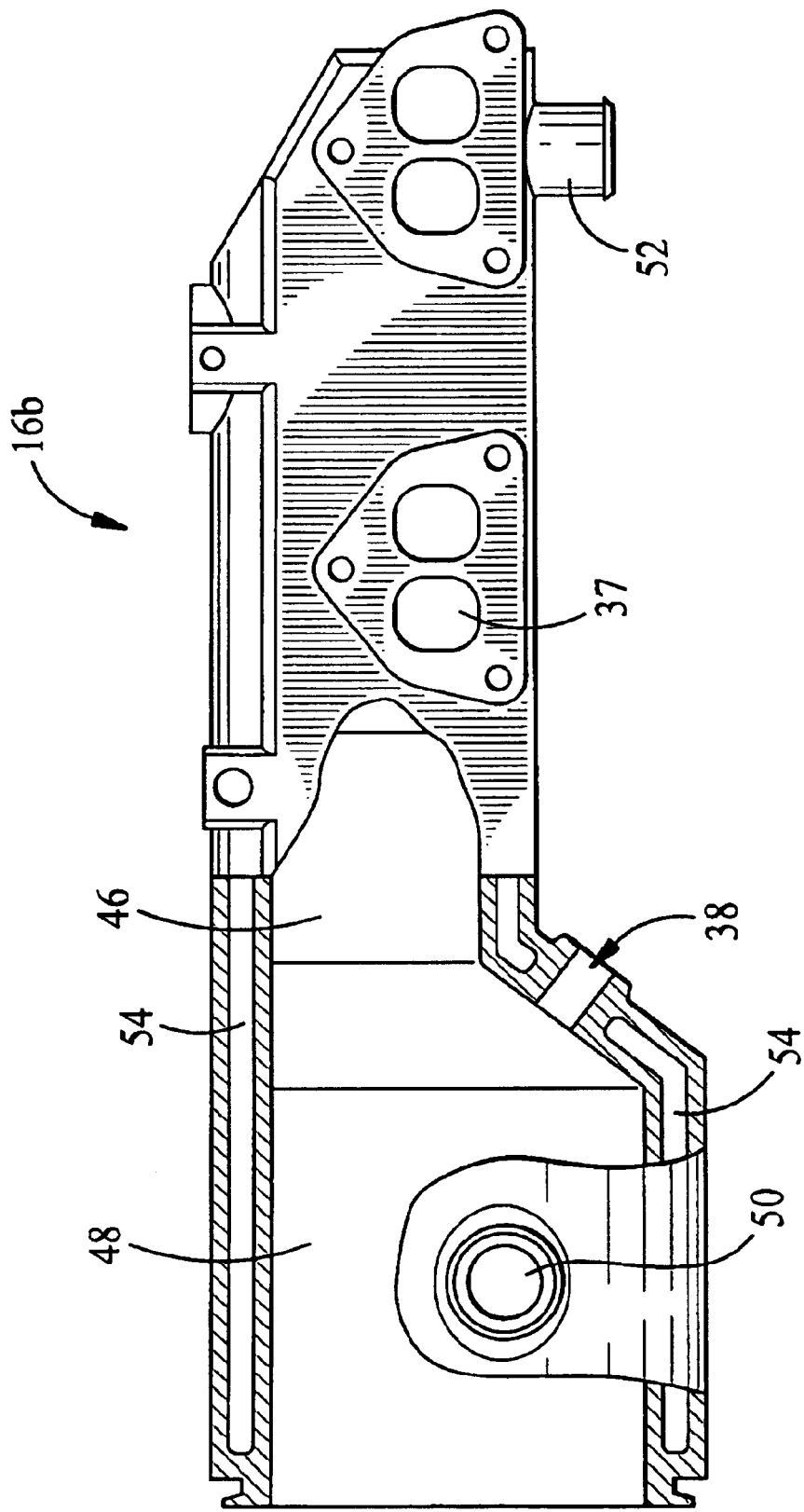
FIG. 5 is a partial cross-sectional view of the manifold of FIG. 4.

FIGS. 4 and 5 show another example of a dual bed catalyst manifold 16b. Both catalyst beds are loaded as cylinders from the large end of the manifold, with the NOx catalyst loaded into bore 46 and the CO catalyst loaded into bore 48. In this example, coolant enters the manifold at inlet 50 and leaves the manifold at outlet 52, without joining the exhaust stream. The cooling channels 54 cast into the manifold are partially shown in FIG. 5, providing a closed flow path between inlet 50 and outlet 52.

Various control techniques may be employed to vary air injection rate for good CO reduction. One presently preferred approach is to vary the air injection rate as a function of approximate engine load. In one test using a Westerbeke 4-cylinder, 1.5 liter gasoline engine and the palladium-platinum second catalyst bed described above, the lowest CO emissions were provided by varying the rate of air flow into the manifold ahead of the second catalyst (at 100 liter per minute graduations) according to the following table:

| Engine Load (Percent Full Load) | Air Flow Rate (liters per minute) |
| --- | --- |
| 100 | 500 |
| 75 | 500 |
| 50 | 500 |
| 25 | 400 |
| 10 | 300 |
| 0 | 300 |

Of course, optimal air flow rates will be different for different applications. The air flow controller can be configured to interpolate between adjacent entries in the load-air correlation table to provide finer control sensitivity.

There are various ways to determine approximate engine load, such that a table like that shown above can be used to determine an optimal air injection rate. For example, if substantially all of the engine load is provided by an electrical generator (as shown in FIG. 1), monitoring the electrical output of the generator can provide a good estimate of engine load. Current can be monitored as a most direct measure of electrical load, such as by providing a current transformer about the output of the generator. In some cases in which generator voltage is known to predictably decrease a measurable amount with load, voltage may alternately be monitored. In most cases, however, current monitoring is preferred for systems with proper generator voltage regulation. Other options include measuring engine output driveshaft torque (or some measurable parameter that varies predictably with torque), or measuring the pressure within the manifold, such as upstream of the catalyst beds, or exhaust backpressure below the catalysts and above a muffler or other exhaust restriction. Because the engine speed is substantially fixed in the primary embodiments, other parameters may also be found to vary predictably with engine load, such as throttle position and fuel flow rate, for example.

Referring back to FIG. 2, for example, an exhaust pressure sensor 62 can be placed in the manifold 16, to measure exhaust manifold pressure, or downstream of second catalyst bed 36 to measure exhaust backpressure developed upstream of a muffler or other exhaust restriction (not shown). If the air pump delivering air to inlet 38 is not a fixed displacement pump, changes in exhaust backpressure with engine load can cause a significant fluctuation in the injected air rate. This fluctuation will tend to work against the desired variation of air flow rate with engine load, as backpressure, which rises with engine load, will cause a reduction in air injection rate that should be accounted for in the control of the pump or valve. It will be understood that sensors 62 are shown in optional and alternative locations, and are not necessary in some embodiments, such as when air flow rate is controlled as a function of generator current or some other primary control parameter.

Figure 6:
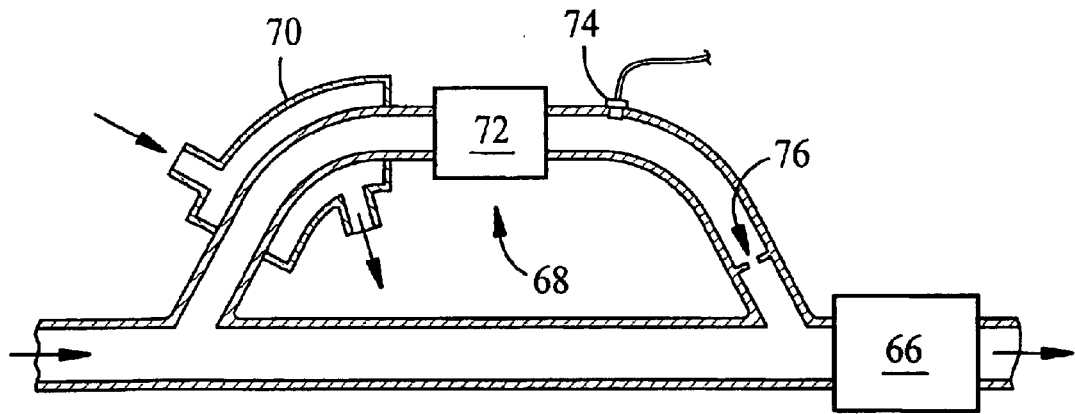
FIG. 6 shows exhaust flow diversion past a carbon monoxide (CO) sensor.

Alternatively, the air injection rate can be controlled as a function of other measured parameters that signify catalysis efficiency. For example, a CO sensor may be provided downstream of the catalysts. Referring to FIG. 6, exhaust coming from the catalysts flows through a muffler 66. Upstream of the muffler, a portion of the exhaust flow is diverted into a parallel flow path 68. The diverted flow flows through a cooler 70 and/or a filter 72 before encountering a CO sensor 74 (such as models TGS203 or TGS2442 from Figaro USA Inc. of Glenview, Ill.) that sends a signal indicating carbon monoxide content back to the air flow controller, which adjusts the air injection rate accordingly. Cooler 70 is included, as necessary, to lower exhaust stream temperature to a level compatible with sensor 74 and/or filter 72. Filter 72 is included, as necessary, to remove particulates that may harm sensor 74. The diverted flow may also go through an additional flow restriction 76, if necessary, sized to limit the proportion of exhaust flow through path 68 to within the capacities of cooler 70 and filter 72.

Figure 7:
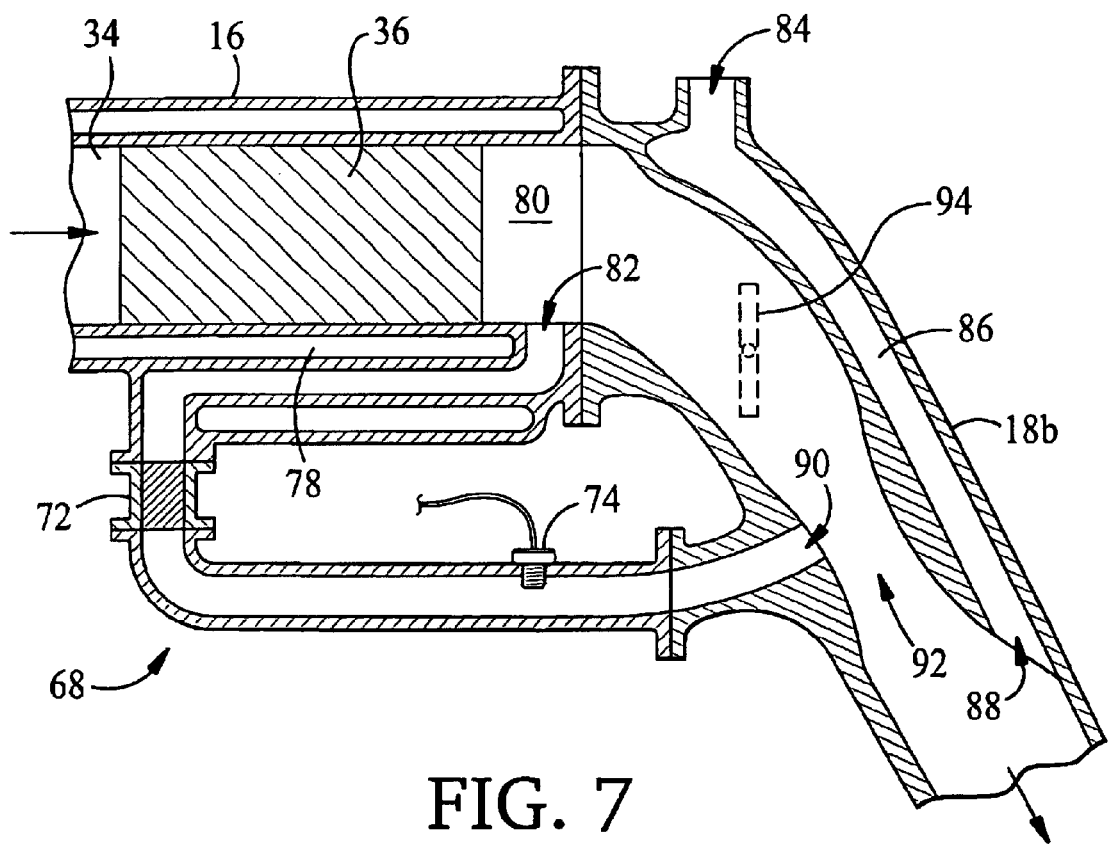
FIG. 7 is a cross-sectional view of an auxiliary exhaust path including a filter and CO sensor.

Referring to FIG. 7, cooling of the diverted exhaust flow can be accomplished within water-jacketed manifold 16b. In this illustrated embodiment, the manifold defines a flow channel 78 open to the main exhaust channel 80 at a diversion port 82. Channel 78 is surrounded by cooling passages 82 through which coolant is circulated. Exhaust flowing along channel 78 is cooled before reaching a removable filter 72 that collects particulates. The cooled, filtered exhaust then reaches CO sensor 74 before returning to the main exhaust flow in elbow 18b. Cooling seawater is introduced into the recombined exhaust flow within the elbow, the seawater entering the elbow at a coolant inlet 84 and flowing along a water channel 86 to a coolant outlet 88. A positive flow of diverted exhaust through channel 78 can be assured by positioning the outlet 90 of the auxiliary flow path within an exhaust venturi 92 defined in elbow 18b, so as to reduce exhaust pressure at outlet 90 to draw exhaust through filter 72. The proportion of diverted exhaust can also be controlled by a valve 94 (shown in dashed outline) in the main exhaust path between the auxiliary path inlet 82 and outlet 90. If employed in combination with active air flow variation as discussed above, valve 94 may also be controlled by the air flow controller as a function of engine load, for example.

Because CO emissions tend to increase both when air flow is too high and when air flow is too low, a second order control approach is employed with the sensing method of FIGS. 6 and 7. The air flow controller (not shown) takes consecutive readings from sensor 74 as air injection rate is varied, monitoring CO content for a local minimum as a function of air flow rate. The necessary responsiveness of the sensor and control algorithm will in part be determined by the speed at which load may vary in any given application. For control stability, the effective response speed of the valve or air pump may have to be reduced by appropriate control mechanisms, particularly for slower sensor technologies. Furthermore, valve or pump control may be limited to fixed increments, such as of about 50 liters per minute. From any given starting flow rate, the controller moves to an adjacent rate increment and watches for a change in CO output. If the sensed CO content increases, the controller moves two rate increments in the other direction (i.e., past the starting flow rate) and again checks the CO output. If the initial CO output is the lowest of the three readings, the starting flow rate is maintained and the cycle repeated. If either of the other sensed CO outputs is lower, that flow rate is taken as the starting point for the next cycle. Temperature feedback may also be provided from near the CO sensor, to adjust for sensor output variations with temperature. Because the control algorithm is responsive only to relative CO values over short time increments, long term calibration accuracy of the sensor is unnecessary. Other appropriate control algorithms will be understood by those of skill in the art, and can be designed appropriate to the responsiveness of the sensor, catalyst and air flow changing means.

Other measured or monitored parameters, such as air/fuel ratio or oxygen content in the exhaust, may also be employed, in certain applications, as feedback for controlling air injection.

Another alternative is to sense the temperature of the CO catalyst or the exhaust mixture upstream or downstream of the second catalyst bed and to adjust air flow to optimize catalyst temperature. For example, referring to FIG. 3, a thermistor 60 is positioned to sense the temperature of the mixture of air and exhaust entering second catalyst bed 36. A signal from the thermistor is received by the controller 24 (FIG. 1), which adjusts the flow of air into chamber 34 to maintain the temperature of the air-exhaust mixture entering the second catalyst at about 1000 degrees Fahrenheit (540 degrees Celsius), such as in lieu of sensing generator current. In this manner, the second catalyst bed may be kept at a proper temperature for catalysis, even in cases where the catalyst housing must be water-jacketed to keep external exhaust temperatures relatively low. Thermocouples and other temperature-responsive sensing devices may also be employed.

A number of embodiments of the invention have been described. Nevertheless, it will be understood that various modifications may be made without departing from the spirit and scope of the invention. Accordingly, other embodiments are within the scope of the following claims.

What is claimed is:

1. A method of controlling emissions from a fixed-speed internal combustion engine, the method comprising
   governing engine speed with respect to a selected constant speed;
   flowing exhaust from the engine through a water-jacketing housing of an exhaust system, the exhaust flowing through, in order, a first catalyst, an inter-catalyst space, and a second catalyst, the first and second catalysts substantially being disposed within the housing of the exhaust system;
   injecting oxygen-laden gas into the exhaust in the inter-catalyst space, such that the exhaust and the oxygen-laden gas both flow through the second catalyst; and
   controlling a rate of oxygen-laden gas injection as a function of a variable that changes with engine load.

2. The method of claim 1 wherein controlling the gas injection rate includes electronically monitoring the variable that varies with engine load.

3. The method of claim 2 wherein controlling the gas injection rate further includes selecting the rate of gas injection from a specific series of discrete rates as a function of the monitored variable.

4. The method of claim 2 wherein the gas injection rate is controlled by an electronic controller with memory configured to store a predetermined table of variable values and associated gas injection rates.

5. The method of claim 1 wherein the engine is driving an electrical generator.

6. The method of claim 5 wherein the variable comprises generator output current.

7. The method of claim 1 wherein the variable comprises engine driveshaft torque.

8. The method of claim 1 wherein the variable comprises exhaust manifold pressure.

9. The method of claim 1 wherein controlling the gas injection rate includes increasing the injection rate when engine load increases.

10. The method of claim 1 wherein controlling the gas injection rate includes varying operating speed of an air pump motivating the oxygen-laden gas into the inter-catalyst space.

11. The method of claim 1 wherein controlling the gas injection rate includes modulating a valve operably disposed between a source of pressurized oxygen-laden gas and the inter-catalyst space.

12. The method of claim 11 wherein the valve is a dump valve modulated to dump a variable proportion of an incoming flow of gas to atmosphere.

13. The method of claim 1 wherein the oxygen-laden gas comprises atmospheric air.

14. The method of claim 1 further comprising injecting water into the exhaust downstream of the second catalyst.

15. The method of claim 14 wherein the injected water comprises seawater.

16. The method of claim 1 wherein cooling water flowing through the housing is injected into the exhaust downstream of the second catalyst.

17. The method of claim 1 wherein the first catalyst is disposed within a water-jacketed exhaust manifold, and wherein the second catalyst is disposed within a water-jacketed exhaust elbow secured to an outlet of the manifold, with cooling water flowing from the manifold into the elbow before mixing with the exhaust.

18. A method of controlling emissions from a fixed-speed internal combustion engine, the method comprising
   governing engine speed with respect to a selected constant speed;
   flowing exhaust from the engine through a water-jacketing housing of an exhaust system, the exhaust flowing through, in order, a first catalyst, an inter-catalyst space, and a second catalyst, the first and second catalysts being substantially disposed within the housing of the exhaust system;
   injecting oxygen-laden gas into the exhaust in the inter-catalyst space, such that the exhaust and the oxygen-laden gas both flow through the second catalyst; and
   controlling a rate of oxygen-laden gas injection as a function of temperature within the inter-catalyst space.

19. The method of claim 18 wherein controlling the gas injection rate includes electronically monitoring inter-catalyst space temperature.

20. The method of claim 19 controlling the gas injection rate further includes selecting the rate of gas injection from a specific series of discrete rates as a function of inter-catalyst space temperature.

21. The method of claim 18 wherein the engine is driving an electrical generator.

22. The method of claim 18 wherein controlling the gas injection rate includes increasing the injection rate when inter-catalyst space temperature increases.

23. The method of claim 18 wherein controlling the gas injection rate includes varying operating speed of an air pump motivating the oxygen-laden gas into the inter-catalyst space.

24. The method of claim 18 wherein controlling the gas injection rate includes modulating a valve operably disposed between a source of pressurized oxygen-laden gas and the inter-catalyst space.

25. The method of claim 24 wherein the valve is a dump valve modulated to dump a variable proportion of an incoming flow of gas to atmosphere.

26. The method of claim 18 wherein the oxygen-laden gas comprises atmospheric air.

27. The method of claim 18 further comprising injecting water into the exhaust downstream of the second catalyst.

28. The method of claim 27 wherein the injected water comprises seawater.

29. The method of claim 18 wherein cooling water flowing through the housing is injected into the exhaust downstream of the second catalyst.

30. The method of claim 18 wherein the first catalyst is disposed within a water-jacketed exhaust manifold, and wherein the second catalyst is disposed within a water-jacketed exhaust elbow secured to an outlet of the manifold, with cooling water flowing from the manifold into the elbow before mixing with the exhaust.

31. An engine-generator set comprising
a fixed-speed internal combustion engine, the engine including an exhaust system comprising a water-jacketing housing substantially containing first and second catalyst beds and defining an inter-catalyst space between the beds;
an electrical generator coupled to an output shaft of the engine; and
an air pump connected to the exhaust system to introduce a flow of air into the inter-catalyst space as a function of a variable that changes with engine load.

32. The engine-generator set of claim 31 wherein the flow of air is controlled by an electronic controller.

33. The engine-generator set of claim 32 wherein the controller is configured to select a rate of gas injection from a specific series of discrete rates as a function of the monitored variable.

34. The engine-generator set of claim 32 wherein the controller includes memory configured to store a predetermined table of variable values and associated gas injection rates.

35. The engine-generator set of claim 31 wherein the variable comprises generator output current, the engine-generator set including a sensor responsive to generator output current.

36. The engine-generator set of claim 31 wherein the variable comprises engine driveshaft torque, the engine-generator set including a sensor responsive to driveshaft torque.

37. The engine-generator set of claim 31 wherein the variable comprises exhaust manifold pressure, the exhaust system including a sensor responsive to exhaust manifold pressure.

38. The engine-generator set of claim 31 wherein the variable comprises exhaust backpressure, the exhaust system including a sensor responsive to exhaust pressure downstream of the catalyst beds.

39. The engine-generator set of claim 31 wherein the air pump is electrically driven, and wherein a speed of the pump is controlled as a function of the variable that changes with engine load.

40. The engine-generator set of claim 31 wherein the air pump is driven by the engine, and wherein the flow of air is introduced into the inter-catalyst space through a valve that is controlled as a function of the variable that changes with engine load.

41. The engine-generator set of claim 40 wherein the valve is a dump valve modulated to dump a variable proportion of an incoming flow of gas to atmosphere.

42. The engine-generator set of claim 31 wherein cooling water flowing through the housing is injected into the exhaust downstream of the second catalyst.

43. The engine-generator set of claim 31 wherein the first catalyst is disposed within a water-jacketed exhaust manifold, and wherein the second catalyst is disposed within a water-jacketed exhaust elbow secured to an outlet of the manifold, with cooling water flowing from the manifold into the elbow before mixing with the exhaust.

44. The engine-generator set of claim 31 wherein the water-jacketed housing is hydraulically connected to a source of seawater.

45. The engine-generator set of claim 31 wherein the inter-catalyst space is also disposed within the water-jacketed housing.

46. The engine-generator set of claim 31 mounted to the hull of a boat for providing on-board electrical power.

47. An engine-generator set comprising
a fixed-speed internal combustion engine, the engine including an exhaust system containing first and second catalyst beds and defining an inter-catalyst space between the beds;
an electrical generator coupled to an output shaft of the engine; and
an air pump connected to the exhaust system to introduce a flow of air into the inter-catalyst space as a function of temperature within the inter-catalyst space,
wherein the first and second catalysts are both disposed within a water-jacketed housing.

48. The engine-generator set of claim 47 wherein cooling water flowing through the housing is injected into the exhaust downstream of the second catalyst.

49. The engine-generator set of claim 47 wherein the first catalyst is disposed within a water-jacketed exhaust manifold, and wherein the second catalyst is disposed within a water-jacketed exhaust elbow secured to an outlet of the manifold, with cooling water flowing from the manifold into the elbow before mixing with the exhaust.

50. The engine-generator set of claim 47 wherein the water-jacketed housing is hydraulically connected to a source of seawater.

51. The engine-generator set of claim 47 wherein the inter-catalyst space is also disposed within the water-jacketed housing.

52. The engine-generator set of claim 47 mounted to the hull of a boat for providing on-board electrical power.

53. The engine-generator set of claim 47 including a temperature sensor disposed within the inter-catalyst space and spaced from both first and second catalysts, and an air flow controller adapted to receive a signal from the temperature sensor and to vary flow of air into the inter-catalyst space as a function of the received signal.

54. A method of controlling emissions from a fixed-speed internal combustion engine, the method comprising governing engine speed with respect to a selected constant speed;

flowing exhaust from the engine through an exhaust system, the exhaust flowing through, in order, a first catalyst, an inter-catalyst space, and a second catalyst;

injecting oxygen-laden gas into the exhaust in the inter-catalyst space, such that the exhaust and the oxygen-laden gas both flow through the second catalyst; and sensing carbon monoxide at a point downstream of the second catalyst; and controlling a rate of injection of the oxygen-laden gas as a function of sensed carbon monoxide.

55. The method of claim 54 wherein controlling the rate of injection of the oxygen-laden gas includes varying the rate of injection as a function of a variation of sensed carbon monoxide between different injection rates.

56. The method of claim 54 wherein a portion of the exhaust is diverted into an auxiliary flow path downstream of the catalysts, and wherein carbon monoxide is sensed by a sensor disposed along the auxiliary flow path.

57. The method of claim 56 wherein the diverted portion of exhaust is passed through a cooler disposed along the auxiliary flow path upstream of the sensor.

58. The method of claim 56 wherein the diverted portion of exhaust is passed through a filter disposed along the auxiliary flow path upstream of the sensor.

* * * * *